US 11,559,846 B2

(12) United States Patent
Abraham et al.

(10) Patent No.: US 11,559,846 B2
(45) Date of Patent: Jan. 24, 2023

(54) BRAZING BY EXPANSION USING A SPACER

(71) Applicant: Hamilton Sundstrand Corporation, Charlotte, NC (US)

(72) Inventors: Benjamin Abraham, Marlborough, CT (US); Timothy D. Scull, Riverton, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/097,134

(22) Filed: Nov. 13, 2020

(65) Prior Publication Data

US 2022/0152717 A1    May 19, 2022

(51) Int. Cl.
*B23K 5/22* (2006.01)
*B23K 1/00* (2006.01)
*B23K 3/08* (2006.01)
*B23K 101/14* (2006.01)

(52) U.S. Cl.
CPC ............ *B23K 1/0012* (2013.01); *B23K 3/087* (2013.01); *B23K 2101/14* (2018.08); *F28F 2275/045* (2013.01)

(58) Field of Classification Search
CPC .. B23K 3/087; B23K 1/0012; F28F 2275/045
See application file for complete search history.

(56) References Cited

U.S. PATENT DOCUMENTS

| 3,941,293 | A | * | 3/1976 | Chartet | B23K 1/0012 228/44.3 |
| 4,053,969 | A | * | 10/1977 | Bayard | F28D 9/0062 29/890.039 |
| 4,128,235 | A | * | 12/1978 | Gersbacher | B23K 1/0012 228/183 |
| 4,155,157 | A | * | 5/1979 | Gersbacher | B23K 1/0012 228/44.3 |

(Continued)

FOREIGN PATENT DOCUMENTS

| CN | 109551076 A | 4/2019 |
| EP | 1579942 A1 | 9/2005 |

(Continued)

OTHER PUBLICATIONS

European Search Report for European Application No. 21207471.0; dated Mar. 29, 2022; 24 pages.

*Primary Examiner* — Erin B Saad
*Assistant Examiner* — Carlos J Gamino
(74) *Attorney, Agent, or Firm* — Cantor Colburn LLP

(57) ABSTRACT

A heat exchanger brazing fixture including a baseplate including a first surface and a second surface located opposite the first surface and a first post including a first end and a second end located opposite the first end. The first post is operably associated with the first surface of the baseplate at the first end. The A heat exchanger brazing fixture further including a top plate operably connected to the first post and separated from the first surface of the baseplate by a selected (Continued)

Figure 1:
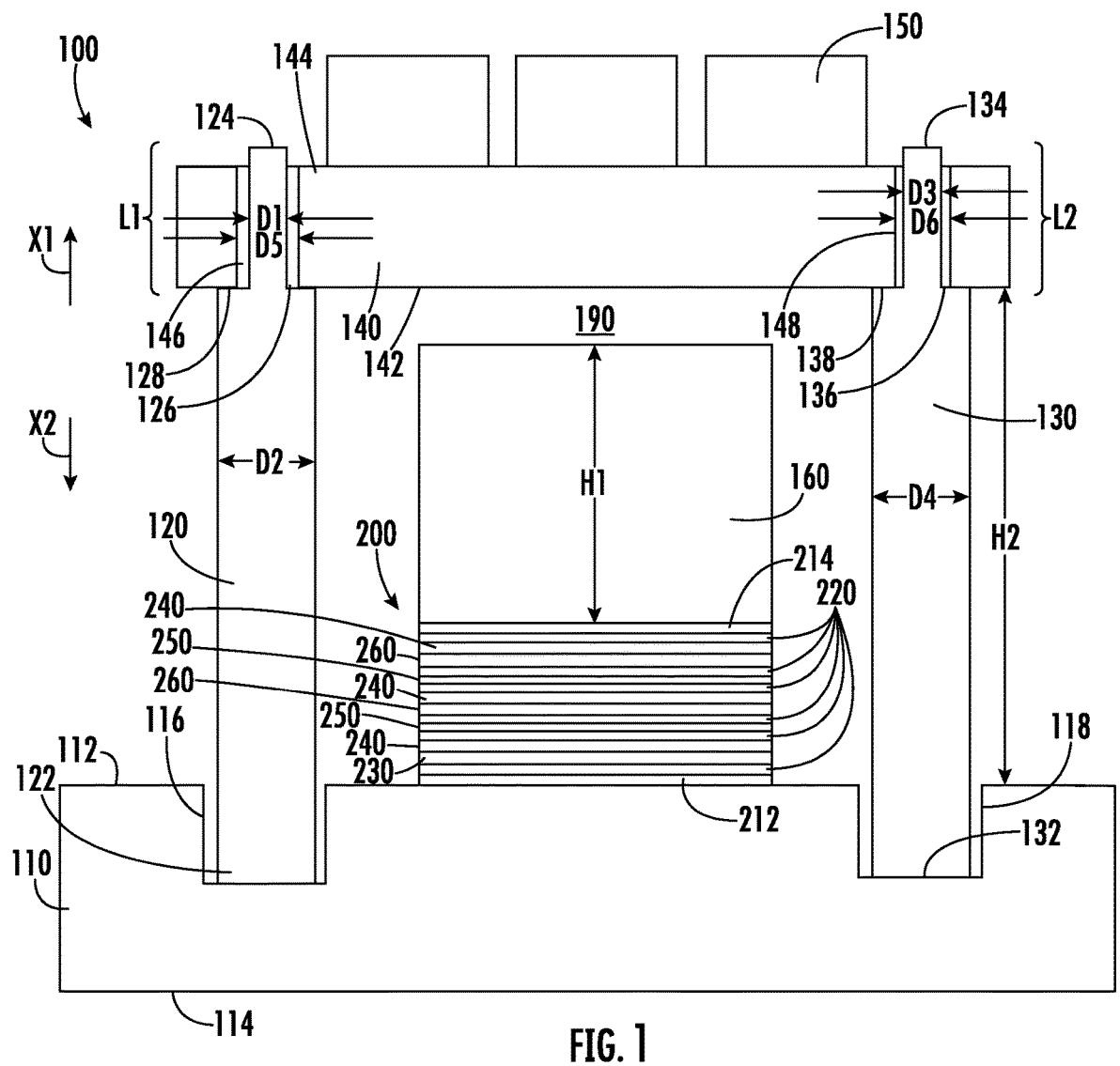

distance. The top plate being configured to move in a first direction along the first post when a heat exchanger resting upon the first surface of the baseplate expands during a brazing process.

10 Claims, 2 Drawing Sheets

(56) References Cited

U.S. PATENT DOCUMENTS

| | | | | |
|---|---|---|---|---|
| 4,429,824 A * | 2/1984 | Woodward | ........... | B23K 20/233 228/15.1 |
| 5,176,499 A * | 1/1993 | Damlis | ................... | B23P 15/04 29/888.024 |
| 5,927,589 A * | 7/1999 | Yang | .................... | H05K 13/046 228/44.7 |
| 5,984,165 A * | 11/1999 | Inoue | ................... | B23K 1/0056 219/209 |
| 6,129,257 A * | 10/2000 | Xu | ......................... | B23K 3/087 228/44.3 |
| 6,206,272 B1 * | 3/2001 | Waldron-Floyde | .... | H05K 3/303 228/179.1 |
| 6,829,824 B2 * | 12/2004 | Reschnar | ............. | B23K 1/0012 165/166 |
| 10,319,619 B2 * | 6/2019 | Son | ....................... | H01L 21/687 |
| 2005/0109816 A1 * | 5/2005 | Swartzbeck | ....... | B23K 37/0435 228/44.3 |
| 2008/0006528 A1 * | 1/2008 | Gilman | ............... | C23C 14/3414 204/298.12 |
| 2010/0133325 A1 * | 6/2010 | Buck | ..................... | B23K 3/087 228/190 |
| 2015/0314405 A1 * | 11/2015 | Na | ..................... | B23K 37/0408 29/890.04 |

FOREIGN PATENT DOCUMENTS

| | | |
|---|---|---|
| GB | 2232370 A | 12/1990 |
| JP | 200836650 A | 2/2008 |

* cited by examiner

BRAZING BY EXPANSION USING A SPACER

BACKGROUND

The subject matter disclosed herein relates generally to the field of heat exchangers, and specifically to an apparatus and method for brazing heat exchangers.

Components of a heat exchangers often need to be clamped under constant pressure during a brazing process, which may result in bowing in some of the final sheets of the heat exchanger.

BRIEF SUMMARY

A heat exchanger brazing fixture is provided. The heat exchanger brazing fixture including: a baseplate including a first surface and a second surface located opposite the first surface and a first post including a first end and a second end located opposite the first end. The first post is operably associated with the first surface of the baseplate at the first end. The A heat exchanger brazing fixture further including a top plate operably connected to the first post and separated from the first surface of the baseplate by a selected distance. The top plate being configured to move in a first direction along the first post when a heat exchanger resting upon the first surface of the baseplate expands during a brazing process.

In addition to one or more of the features described above, or as an alternative, further embodiments may include that the first post further includes an intermediate point between the first end and the second end, the first post having a first diameter located between the second end and the intermediate point and a second diameter located between the first end and the intermediate point. The first diameter is less than the second diameter.

In addition to one or more of the features described above, or as an alternative, further embodiments may include that the top plate further includes a first side, a second side opposite the first side, and a first hole extending from the first side to the second side. The second end of the first post is inserted into the first hole up to the intermediate point of the first post.

In addition to one or more of the features described above, or as an alternative, further embodiments may include that a seat is located at the intermediate point and the top plate is configured to rest on the seat of the first post.

In addition to one or more of the features described above, or as an alternative, further embodiments may include one or more weights configured to weigh down the top plate.

In addition to one or more of the features described above, or as an alternative, further embodiments may include a spacer configured to rest on the heat exchanger.

In addition to one or more of the features described above, or as an alternative, further embodiments may include a spacer interposed between the heat exchanger and the top plate, the spacer being configured to move in the first direction when the heat exchanger expands during the brazing process.

In addition to one or more of the features described above, or as an alternative, further embodiments may include a spacer interposed between the heat exchanger and the top plate. The spacer being configured to move in the first direction and impact the first side of the top plate when the heat exchanger expands during the brazing process.

In addition to one or more of the features described above, or as an alternative, further embodiments may include a second post including a first end of the second post and a second end of the second post located opposite the first end of the second post. The second post is operably associated with the first surface of the baseplate at the first end of the second post.

In addition to one or more of the features described above, or as an alternative, further embodiments may include that the second post further includes an intermediate point of the second post between the first end of the second post and the second end of the second post. The second post having a third diameter located between the second end of the second post and the intermediate point of the second post and a fourth diameter located between the first end of the second post and the intermediate point of the second post. The third diameter is less than the fourth diameter.

In addition to one or more of the features described above, or as an alternative, further embodiments may include that the top plate further includes a second hole extending from the first side to the second side. The second end of the second post is inserted into the second hole up to the intermediate point of the second post.

In addition to one or more of the features described above, or as an alternative, further embodiments may include that a seat of the first post is located at the intermediate point of the first post and a seat of the second post is located at the intermediate point of the second post. The top plate is configured to rest on the seat of the first post and the seat of the second post.

According to another embodiment, a method of brazing a heat exchanger using a heat exchanger brazing fixture is provided. The method including: placing the heat exchanger on a baseplate of the heat exchanger brazing fixture, the baseplate including a first surface and a second surface opposite the first surface, the heat exchanger resting upon the first surface; operably connecting a top plate to a first post of the heat exchanger brazing fixture, the first post including a first end and a second end located opposite the first end. The first post is operably associated with the first surface of the baseplate at the first end. The top plate is separated from the first surface of the baseplate by a selected distance, the top plate being configured to move in a first direction along the first post when the heat exchanger resting upon the first surface of the baseplate expands during a brazing process; and increasing a temperature of the heat exchanger to perform the brazing process.

In addition to one or more of the features described above, or as an alternative, further embodiments may include placing one or more weights on top of the top plate.

In addition to one or more of the features described above, or as an alternative, further embodiments may include placing a spacer in between the heat exchanger and the top plate.

In addition to one or more of the features described above, or as an alternative, further embodiments may include placing a spacer on top of the heat exchanger in between the heat exchanger and the top plate.

In addition to one or more of the features described above, or as an alternative, further embodiments may include inserting the second end of the first post through a first hole in the top plate.

In addition to one or more of the features described above, or as an alternative, further embodiments may include operably connecting the top plate to a second post of the heat exchanger brazing fixture, the second post including a first end of the second post and a second end of the second post located opposite the first end of the second post. The second post is operably associated with the first surface of the baseplate at the first end of the second post.

In addition to one or more of the features described above, or as an alternative, further embodiments may include inserting the second end of the second post through a second hole in the top plate.

In addition to one or more of the features described above, or as an alternative, further embodiments may include allowing the heat exchanger to expand for a selected period of time in the first direction during the brazing process prior to moving the top plate in the first direction.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
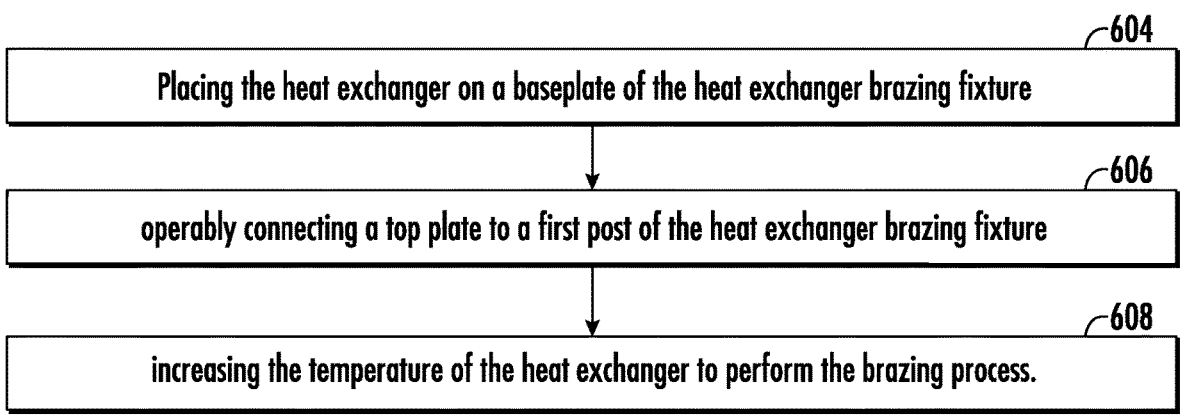

The following descriptions should not be considered limiting in any way. With reference to the accompanying drawings, like elements are numbered alike:

FIG. 1 illustrates a cross-sectional view of a heat exchanger brazing fixture, according to an embodiment of the present disclosure; and FIG. 2 illustrates a flow chart of a method of brazing a heat exchanger using a heat exchanger brazing fixture, in accordance with an embodiment of the present disclosure.

DETAILED DESCRIPTION

A detailed description of one or more embodiments of the disclosed apparatus and method are presented herein by way of exemplification and not limitation with reference to the Figures.

Heat exchangers are typically constructed utilizing alternating layers of parting sheets, closure bars, fins and brazing sheets, foils, which are clamped together and then brazed at high temperatures (e.g., 1950° F.). The fins may be captured with the closure bars which are designed as a frame within which the fins are placed. The high temperatures of the brazing process results in expansion of the layers of closure bars, parting sheets, and brazing sheets. This expansion causes the parting sheets to bow due to the clamping of the layers. This expansion in turn causes the fins to bow. Embodiments disclosed herein seek to allow the layers of fins to expand freely during high temperatures of the brazing process to a hard limit or stopping point, which helps to avoid bowing of the parting sheets and in turn the fins.

Referring now to FIG. 1, a cross-sectional view of a heat exchanger brazing fixture 100, according to an embodiment of the present disclosure. The heat exchanger brazing fixture 100 includes a baseplate 110, a first post 120, a second post 130, a top plate 140, one or more weights 150, and a spacer 160. It is understood that while two posts 120, 130 are illustrated and described, the embodiments disclosed herein may be applicable to any heat exchanger brazing fixture 100 using one or more posts. For example, in one embodiment, the heat exchanger brazing fixture 100 may utilize one posts. In another embodiment, the heat exchanger brazing fixture 100 may utilize two posts. In yet another embodiment, the heat exchanger brazing fixture 100 may utilize three posts. In still yet another embodiment, the heat exchanger brazing fixture 100 may utilize four posts.

The baseplate 110 includes a first surface 112 and a second surface 114 located opposite the first surface 112. The base plate 110 includes a first recess 116 in the first surface 112 and a second recess 118 located in the first surface 112.

The first post 120 includes a first end 122 and a second end 124 located opposite the first end 122. The first end 122 of the first post 120 is located within the first recess 116 of the baseplate 110. The first end 122 of the first post 120 may be operably associated with the first surface 112 by the first end 122 resting the within the first recess 116 or the first end 122 being attached to the baseplate 110 either at the first surface 112 or within the first recess 116. The first post 120 also includes an intermediate point 126 located between the first end 122 and the second end 124. The first post 120 may have a first diameter D1 located between the second end 124 and the intermediate point 126. The first post 120 may have a second diameter D2 located between the first end 122 and the intermediate point 126. The first diameter D1 is less than the second diameter D2, thus creating a seat 128 at the intermediate point 126. The intermediate point 126 and the seat 128 are located at a first distance L1 away from the second end 124.

The second post 130 includes a first end 132 and a second end 134 located opposite the first end 132. The first end 132 of the second post 130 is located within the second recess 118 of the baseplate 110. The first end 132 of the second post 130 may be operably associated with the first surface 112 by the first end 132 resting the within the second recess 118 or the first end 132 being attached to the baseplate 110 either at the first surface 112 or within the second recess 118. The second post 130 also includes an intermediate point 136 located between the first end 132 and the second end 134. The second post 130 may have a third diameter D3 located between the second end 134 and the intermediate point 136. The second post 130 may have a fourth diameter D4 located between the first end 132 and the intermediate point 136. The third diameter D3 is less than the fourth diameter D4, thus creating a seat 138 at the intermediate point 136. The intermediate point 136 and the seat 138 is located at a second distance L2 away from the second end 134.

The top plate 140 is configured to rest upon the seat 128 of the first post 120 and the seat 138 of the second post 130 when not in the brazing process and the heat exchanger has expanded sufficiently far enough to move the top plate 140 away from the seats 128, 138.

The first diameter D1 may be equal to the third diameter D3, the second diameter D2 may be equal to the fourth diameter D4, and the first distance L1 may be equal to the second distance L2.

The top plate 140 is operably connected to the first post 120 and/or the second post 130 and separated from the first surface 112 of the baseplate 110 by a selected distance H2. The top plate 140 is configured to move in a first direction X1 (e.g., up) along the first post 120 and the second post 130 when a heat exchanger 200 resting on the first surface 112 of the baseplate 110 expands during a brazing process and impacts the top plate 140 either directly or through spacer 160. The top plate 140 is configured to move in a second direction X2 (e.g., down) along the first post 120 and the second post 130 when the heat exchanger 200 resting on the first surface 112 of the baseplate 110 contracts during the brazing process.

The top plate 140 may be weighed down by its own weight and one or more weights 150 located on the top plate 140. The top plate 140 includes a first side 142, a second side 144 opposite the first side 142, a first hole 146 extending from the first side 142 to the second side 144, and a second hole 148 extending from the first side 142 to the second side 144.

The first hole 146 has a fifth diameter D5. The fifth diameter D5 is greater than the first diameter D1. The fifth diameter D5 is less than the second diameter D2. The second end 124 of the first post 120 is inserted into the first hole 146 up to the intermediate point 126 of the first post 120. The fifth diameter D5 being greater than the first diameter D1 but less than the second diameter D2 allows the first side 142 of the top plate 140 to rest upon the seat 128 of the first post 120, as illustrated in FIG. 1

The second hole 148 has a sixth diameter D6. The sixth diameter D6 is greater than the third diameter D3. The sixth diameter D6 is less than the fourth diameter D4. The second end 134 of the second post 130 is inserted into the second hole 148 up to the intermediate point 136 of the second post 130. The sixth diameter D6 being greater than the third diameter D3 but less than the fourth diameter D4 allows the first side 142 of the top plate 140 to rest upon the seat 138 of the second post 130, as illustrated in FIG. 1

The first post 120, the second post 130, the first hole 146, and the second hole 148 may each be circular in shape.

A heat exchanger 200 is configured to rest upon the first surface 112 of the baseplate 110. The heat exchanger 200 may be composed of alternating layers of braze foils 220, parting sheets 250, closure bars 240, and fins 230. The braze foils 220 and fins 230 are sandwiched between a first end sheet 212 and a second end sheet 214. The heat exchanger 200 may include one or more parting sheets 250 interposed between the braze foils 220 and fins 230, as illustrated in FIG. 1. The heat exchanger 200 may include one or more closure bars 240 interposed between the braze foils 220 and parting sheets 250, as illustrated in FIG. 1. The fins 230 are placed within the closure bars 240. The first end sheet 212 may rest on the first surface 112 of the baseplate 110.

The heat exchanger brazing fixture 100 may include a spacer 160 interposed between the heat exchanger 200 and the top plate 140. The spacer 160 may be configured to move in a first direction X1 when the heat exchanger 200 expands during the brazing process. The spacer 160 may be configured to move in a first direction X1 and impact the first side 142 of the top plate 140 when the heat exchanger 200 expands during the brazing process.

The spacer 160 is configured to rest on the heat exchanger 200. More specifically, the spacer 160 is configured to rest on the second end sheet 214. The one or more weights 150 are configured to rest on the second side 144 of the top plate 140.

When the heat exchanger 200 is being brazed at high temperatures, the heat exchanger 200 and spacer 160 will expand in a first direction X1. The first direction may be upward. Gravity may point in a second direction X2 oriented opposite the first direction X1. As the heat exchanger 200 expands, the spacer 160 will move in the first direction X1 towards the top plate 140. Once the spacer 160 contacts the top plate 140, the heat exchanger 200 may continue to expand in the first direction X1 and may lift the top plate 140 off of the seat 128 of the first post 120 and/or the seat 138 of the second post 130. Once the top plate 140 begins to lift off of the seat 128 of the first post 120 and/or the seat 138 of the second post 130, the weight of the top plate 140 and weight of the weights 150 will be supported by the spacer 160 and the heat exchanger 200, thus exerting a pressure on the heat exchanger 200.

The heat exchanger 200 is known to expand at a known rate under a known heat load during brazing, thus it may be determined when the spacer will impact the first side 142 of the top plate 140. A height H1 of the spacer 160 and/or a selected distance H2 between the first side 142 of the top plate 140 may be adjusted and specifically chosen so that the heat exchanger 200 may experience no externally applied load other than the spacer 160 until an appropriate time. The appropriate time may depend on a ramp up rate and a total mass of heat exchanger 200, spacer 160, and weights 150. The appropriate time may also depend on the temperature chosen at which the heat exchanger 200 and spacer 160 make contact with the top plate 140. This temperature should always be below the solidus of the braze foil 220. The appropriate time will also depend upon the height H1 of the spacer 160 and gap 190. The spacer 160 has a height H1 sized to maintain a gap 190 between the spacer 160 and the first side 142 of the top plate 140 at room temperature prior to start of the brazing process. The gap 190 gets smaller as the temperature rises.

In an embodiment, the spacer 160 may be composed of a corrosion-resistant steel (CRES), such as, for example, CRES 47. In another embodiment, the first post 120 and the second post 130 shall be composed of graphite. Advantageously, the graphite has a very low coefficient of thermal expansion, and the CRES 347 has a very high coefficient of thermal expansion, thus the graphite will expand very little and the CRES 347 will expand a lot more during the braze process.

In an alternative embodiment, the spacer 160 may be attached to the first side 142 of the top plate 140, rather than resting on the second end sheet 214.

Referring now to FIG. 2, with continued reference to FIG. 1, a flow chart of method 600 of brazing a heat exchanger 200 using a heat exchanger brazing fixture 100 is illustrated, in accordance with an embodiment of the disclosure.

At block 602, the heat exchanger 200 is placed on a baseplate 110 of the heat exchanger brazing fixture 100. The baseplate 110 includes a first surface 112 and a second surface 114 opposite the first surface 112. The heat exchanger 200 may rest upon the first surface 112.

At block 604, a top plate 140 is operably connected to a first post 120 of the heat exchanger brazing fixture 100. The first post includes a first end 122 and a second end 124 located opposite the first end 122. The first post 120 is attached to the first surface 112 of the baseplate 110 at the first end 122. The top plate 140 is separated from the first surface 112 of the baseplate 110 by a selected distance H2. The top plate 140 is configured to move in a first direction X1 along the first post 120 when the heat exchanger 200 resting upon the first surface 112 of the baseplate 110 expands during a brazing process. The top plate 140 may be operably connected to the first post 120 by inserting the second end 124 of the first post 120 through a first hole 146 in the top plate 140.

At block 606, the temperature of the heat exchanger 200 is increased to perform the brazing process.

The method 600 may further include that one or more weights 150 are placed on top of the top plate 140. The method 600 may further include that a spacer 160 is placed in between the heat exchanger 200 and the top plate 140. The method 600 may further include that a spacer 160 is placed on top of the heat exchanger 200 in between the heat exchanger 200 and the top plate 140.

The method 600 may further include that the top plate 140 is operably connected to a second post 130 of the heat exchanger brazing fixture 100. The second post 130 including a first end 132 of the second post 130 and a second end 134 of the second post 130 located opposite the first end 132 of the second post 130. The second post 130 is attached to the first surface 112 of the baseplate 110 at the first end 132. The top plate 140 may be operably connected to the second post 130 by inserting the second end 134 of the second post 130 through a second hole 148 in the top plate 140.

The heat exchanger 200 is allowed to expand for a selected period of time in the first direction X1 during the brazing process prior to moving the top plate 140 in the first direction X1.

Technical effects and benefits of the features described herein include allowing the heat exchanger to expand freely (e.g., with only weight of a spacer 160 and unclamped) in a first direction for a selected amount of time prior to impacting a top plate 140.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat exchanger brazing fixture, comprising:
a baseplate comprising a first surface and a second surface located opposite the first surface;
a first post comprising a first end and a second end located opposite the first end, the first post associated with the first surface of the baseplate at the first end;
a top plate resting upon the first post and separated from the first surface of the baseplate by a selected distance, the top plate being configured to move in an upward direction along the first post and away from the baseplate when a heat exchanger resting upon the first surface of the baseplate expands during a brazing process; and
a spacer interposed between the heat exchanger and the top plate, the spacer being configured to rest on the heat exchanger, wherein the spacer is separated from the top plate by a gap at room temperature prior to the brazing process, and the gap is configured to decrease as temperature increases during the brazing process and the heat exchanger expands, the spacer configured to impact the top plate and move the top plate in the upward direction due to expansion of the heat exchanger.

2. The heat exchanger brazing fixture of claim 1, wherein the first post further comprises an intermediate point between the first end and the second end, the first post having a first diameter located between the second end and the intermediate point and a second diameter located between the first end and the intermediate point, and wherein the first diameter is less than the second diameter.

3. The heat exchanger brazing fixture of claim 2, wherein the top plate further comprises a first side, a second side opposite the first side, and a first hole extending from the first side to the second side, and wherein the second end of the first post is inserted into the first hole up to the intermediate point of the first post.

4. The heat exchanger brazing fixture of claim 3, wherein a seat is located at the intermediate point and the top plate is configured to rest on the seat of the first post.

5. The heat exchanger brazing fixture of claim 1, further comprising one or more weights configured to weigh down the top plate.

6. The heat exchanger brazing fixture of claim 3, wherein the spacer is configured to move in the first upward direction and impact the first side of the top plate when the heat exchanger expands during the brazing process.

7. The heat exchanger brazing fixture of claim 3, further comprising a second post comprising a first end of the second post and a second end of the second post located opposite the first end of the second post, the second post is operably associated with the first surface of the baseplate at the first end of the second post.

8. The heat exchanger brazing fixture of claim 7, wherein the second post further comprises an intermediate point of the second post between the first end of the second post and the second end of the second post, the second post having a third diameter located between the second end of the second post and the intermediate point of the second post and a fourth diameter located between the first end of the second post and the intermediate point of the second post, and wherein the third diameter is less than the fourth diameter.

9. The heat exchanger brazing fixture of claim 8, wherein the top plate further comprises a second hole extending from the first side to the second side, and wherein the second end of the second post is inserted into the second hole up to the intermediate point of the second post.

10. The heat exchanger brazing fixture of claim 9, wherein a seat of the first post is located at the intermediate point of the first post and a seat of the second post is located at the intermediate point of the second post, wherein the top plate is configured to rest on the seat of the first post and the seat of the second post.

* * * * *